United States Patent [19]

Soderqvist

[11] 3,868,082
[45] Feb. 25, 1975

[54] DEVICE IN A MICROTOME FOR DAMPING OF VIBRATIONS

[75] Inventor: Anton Soderqvist, Vallingby, Sweden

[73] Assignee: LKB-Produkter AB, Bromma, Sweden

[22] Filed: July 16, 1974

[21] Appl. No.: 488,947

[30] Foreign Application Priority Data
July 16, 1973 Sweden .............................. 7309095

[52] U.S. Cl. .............................. 248/358 R, 188/1 B
[51] Int. Cl. ...... F16f 7/10, H02k 41/02, F16f 15/12
[58] Field of Search .................... 248/358 R, 15, 26; 188/1 B

[56] References Cited
UNITED STATES PATENTS

| | | | |
|---|---|---|---|
| 2,571,780 | 10/1951 | Stoller | 188/1 B |
| 3,091,307 | 5/1963 | Tiedemann et al. | 188/1 B |
| 3,566,993 | 3/1971 | Leatherwood | 188/1 B |
| 3,611,831 | 10/1971 | O'Neill | 188/1 B |
| 3,656,014 | 4/1972 | Rich | 188/1 B X |
| 3,690,414 | 9/1972 | Aggarwal | 188/1 B |
| 3,782,506 | 1/1974 | Yarrington | 188/1 B |

*Primary Examiner*—J. Franklin Foss

[57] ABSTRACT

The present invention relates to a device in a microtome for damping of vibrations in the specimen arm of the microtome. In the damping device according to the present invention the effect of eddy currents is utilized, which will arise in a plate of a material having low resistivity, when said plate is intersected by a magnetic field. According to the invention an axis consisting of a non-magnetic material and rigidly connected to the specimen arm of the microtome is provided with a flange, consisting of a material having low resistivity and two U-magnetized toroid cores, embracing the axis and resiliently suspended in relation to the axis, said U-magnetized toriod cores being affixed relative to each other in order that a constant air gap is at hand between said cores, said U-magnetized toroid cores being arranged in such a way that said flange is surrounded by said air gap.

2 Claims, 3 Drawing Figures

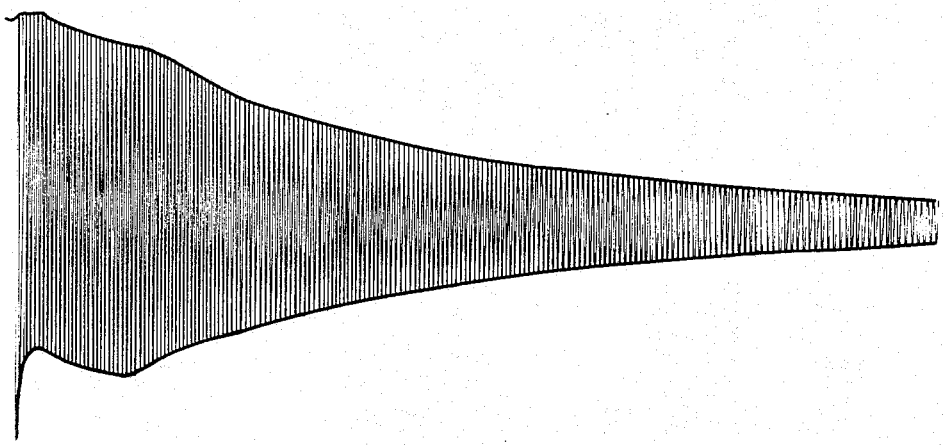
FIG. 2 a
FIG. 2 b
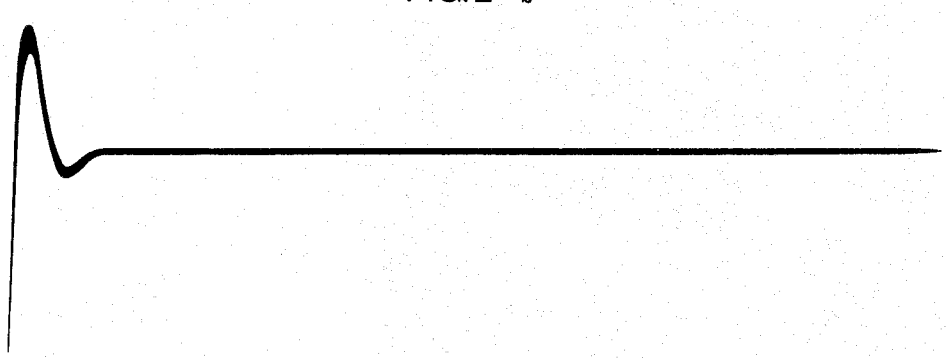

DEVICE IN A MICROTOME FOR DAMPING OF VIBRATIONS

The present invention relates to a device in a microtome for damping of vibrations in the specimen arm of the microtome.

In a microtome, for instance an ultramicrotome, a specimen which is to be sectioned in thin sections is attached to a specimen arm. Generally, the specimen arm is subject to an up and down-motion during feed against a stationary knife, which is cutting a section at each downwards motion of the specimen arm. Then the specimen arm has to be suspended in a way which will permit these different movements with good reproducibility. In that way the specimen arm will be susceptible to vibrations, generated at sectioning itself or by external mechanical disturbances. In order to obtain sections of the best possible quality it is suitable to eliminate such vibrations as far as possible by providing the specimen arm with some kind of damping device. The purpose of the present invention is to provide such a damping device.

In the damping device according to the present invention the effect of eddy currents is utilized, which will arise in a plate of a material having low resistivity, when said plate is intersected by a magnetic field. More closely the invention is constituted in that flanges of a material having low resistivity, for instance copper, is applied to an axis of a non-magnetic material, which is rigidly connected to the specimen arm. Around said axis two U-magnetized toroid cores are arranged, resiliently suspended in relation to the axis.

The characteristics of the invention are obvious from the claims following the specification.

The invention will now be further explained with reference to the attached drawing on which FIG. 1 shows a section through a preferred embodiment of the present invention
and FIG. 2 shows damping curves when a damping device according to the present invention is utilized and without such damping device, respectively.

In FIG. 1 is denoted by 1 an axis which in one or both ends in a known way is affixed to the specimen arm of the microtome, not shown in the figure. 2, 3 and 4 denote flanges of a material, having low resistivity, suitably copper, attached to the axis 1. 5 and 6 denote two U-magnetized toroid cores, which are embracing the axis and which preferably are situated with their poles facing each other, with the north pole of one magnet facing the south pole of the other magnet, which will give an optimal magnetic field in the air gap. The magnets are rigidly connected to each other by mountings 7 in order that a constant air gap 8 is maintained between the magnets. 9 and 10 denote two flanges of soft iron. 11 relates to a resilient element for resilient suspension of the U-magnetized toroid cores in a mainly radial direction. 12 denotes a resilient element for resilient suspension of the U-magnetized toroid cores in a mainly axial direction.

The device shown in FIG. 1 works in the following way. The axis 1 is rigidly connected to the specimen arm. The vibrations exerted on the specimen arm thus are transferred to the axis 1. The U-magnetized toroid cores are resiliently suspended in relation to the axis and hence will be delayed in their motion relative to the axis. At a movement in the radial direction the copper flange 2 will then move perpendicular to the magnetic field, generated by the two magnetic cores in the air gap 8 from the pole of one U-magnetized core to the pole of the other core. According to known physical principles there will arise eddy currents in the copper plate 2. The energy represented by these eddy currents will be taken from the vibrational motion. In this way the latter will be subject to a damping.

The flanges 9 and 10 of soft iron are intended to conduct the stray flux from the U-magnetized toroid cores in order that the flux losses are reduced. In this way a sufficiently strong magnetic flux is achieved at the air gap 13 and 14 in order that damping eddy currents will arise in the copper flanges 3 and 4, respectively, at axial vibrations relative U-magnetized toroid cores. At an axial motion, for instance towards the left in the figure, the air gap 13 is reduced, which will generate eddy currents in the copper plate 3. The air gap 14 will increase, which will generate eddy currents in the copper flange 4. The energy, represented by these eddy currents, is taken from the axial motion, which in that way is damped. As the air gap 8 is constant, no eddy currents will arise in the copper flange 2 at an axial motion. The U-magnetized toroid cores are resiliently suspended in relation to the axis 1, for resilience mainly in radial direction by the resilient elements 11, for resilience mainly in axial direction of the resilient elements 12. The resilient elements suitably consists of O-rings. It is preferred that these are as soft as possible, which will result in a low natural resonance frequency of the system.

By utilizing U-magnetized toroid cores embracing an axis attached to the specimen arm, the magnets can be given a relatively large dimension in relation to the system as such, in which way relatively strong magnetic field can be achieved. The advantage is also gained that a relatively large mass is obtained which in connection with the soft resilient elements will reduce the natural resonance frequency of the system.

By using the two U-magnetized toroid cores also the need for an external soft iron for closing the magnetic circuit is eliminated. Such an external soft iron circuit will result in an unnecessary reduction of the magnetic field strength.

If damping is desired only in radial direction only the copper flange 2 is necessary, of course, while the copper flanges 3 and 4 can be omitted.

FIG. 2a shows the oscillation of a specimen arm without damping device, which has been subject to a push.

FIG. 2b shows the same course of a specimen arm, provided with the damping device according to the invention.

Figure 1:
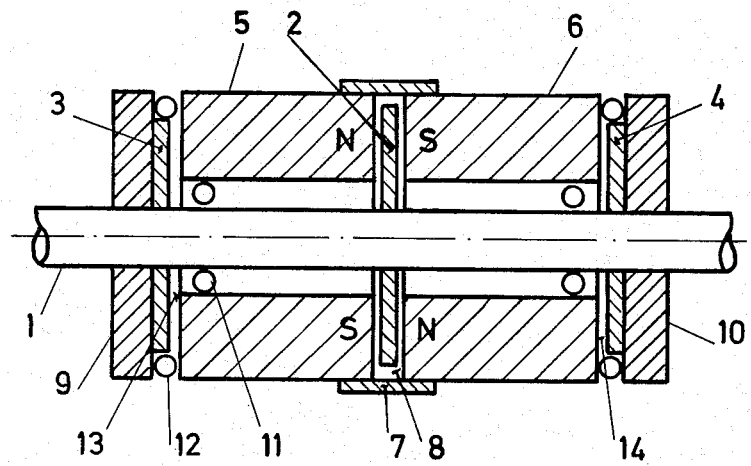

The time scale is 0.25 sec./cm, and FIG. 2 shows significantly the superior damping achieved by the device according to the invention.

I claim:

1. Device in a microtome for damping of vibrations of the specimen arm of the microtome, characterized in that it comprises an axis, consisting of a non-magnetic material and rigidly connected to the specimen arm, said axis being provided with a flange, consisting of a material having low resistivity, and two U-magnetized toroid cores, embracing the axis and resiliently suspended in relation to the axis, said U-magnetized toroid cores being affixed relative to each other in order that a constant air gap is at hand between said cores through which air gap the toroid cores are forcing a magnetic field, said U-magnetized toroid cores being arranged in such a way that said flange is surrounded by said air gap.

2. Device according to claim 1, characterized in that said axis is provided with three flanges, consisting of a material having low resistivity, said U-magnetized toroid cores being arranged in that way that the mid flange is enclosed by said air gap and that the outer flanges are situated outside the U-magnetized toroid cores within the stray flux from the said U-magnetized toroid cores, respectively.

* * * * *